US012619319B2

(12) United States Patent (10) Patent No.: US 12,619,319 B2
Lee et al. (45) Date of Patent: May 5, 2026

(54) HARDWARE BUILT-IN POINTING TRANSMISSION PROCESSING DEVICE AND METHOD

(71) Applicant: UIF (UNIVERSITY INDUSTRY FOUNDATION), YONSEI UNIVERSITY, Seoul (KR)

(72) Inventors: Byungjoo Lee, Seoul (KR); Seonho Kim, Paju-si (KR)

(73) Assignee: UIF (UNIVERSITY INDUSTRY FOUNDATION), YONSEI UNIVERSITY, Seoul (KR)

( * ) Notice: Subject to any disclaimer, the term of this patent is extended or adjusted under 35 U.S.C. 154(b) by 0 days.

(21) Appl. No.: 18/934,125

(22) Filed: Oct. 31, 2024

(65) Prior Publication Data

US 2026/0118972 A1    Apr. 30, 2026

(30) Foreign Application Priority Data

Oct. 30, 2024    (KR) ........................ 10-2024-0151578

(51) Int. Cl.
*G06F 3/03* (2006.01)
*G06F 3/0354* (2013.01)

(52) U.S. Cl.
CPC ........ *G06F 3/0317* (2013.01); *G06F 3/03543* (2013.01)

(58) Field of Classification Search
CPC ........................... G06F 3/0317; G06F 3/03543
See application file for complete search history.

(56) References Cited

U.S. PATENT DOCUMENTS

| | | | | |
|---|---|---|---|---|
| 5,963,195 | A * | 10/1999 | Gregg | G06F 3/03543 |
| | | | | 345/163 |
| 12,210,697 | B1 * | 1/2025 | Wong | G06F 3/03543 |
| 2002/0135563 | A1 * | 9/2002 | Canakapalli | G06F 3/03543 |
| | | | | 345/163 |
| 2008/0062131 | A1 * | 3/2008 | Chan | G06F 3/0383 |
| | | | | 345/166 |
| 2023/0400938 | A1 * | 12/2023 | Goh | G06F 3/03543 |
| 2024/0036669 | A1 * | 2/2024 | Leow | G06F 3/0383 |

FOREIGN PATENT DOCUMENTS

| | | |
|---|---|---|
| KR | 10-1998-0072539 A | 11/1998 |
| KR | 10-2003-0030469 A | 4/2003 |
| KR | 10-2006-0122536 A | 11/2006 |
| KR | 10-2012-0050131 A | 5/2012 |
| KR | 10-2024-0091509 A | 6/2024 |

OTHER PUBLICATIONS

An Office Action mailed by the Korean Ministry of Intellectual Property on Aug. 27, 2025, which corresponds to Korean Patent Application No. 10-2024-0151578 and is related to U.S. Appl. No. 18/934,125.

* cited by examiner

*Primary Examiner* — Ariel A Balaoing
(74) *Attorney, Agent, or Firm* — Studebaker Brackett PLLC

(57) ABSTRACT

The present disclosure relates to a hardware-embedded pointing transfer processing device and method, and the device includes a user control command receiver configured to receive a user control command, a sensor configured to output mouse movement data on the basis of the control command, and a pointing data processor configured to set a user-defined gain based on the mouse movement data and provide a cancellation gain capable of canceling out a default gain provided by an operating system for the user-defined gain.

8 Claims, 13 Drawing Sheets

<u>100</u>

150

Gain computation module ⎯⎯151

Cancellation gain determination module ⎯⎯ 153

Default gain determination module ⎯⎯ 155

Control module ⎯⎯ 157

FIG. 4

The sensor used

Unused

Bottom View

100

HARDWARE BUILT-IN POINTING TRANSMISSION PROCESSING DEVICE AND METHOD

CROSS-REFERENCE TO RELATED APPLICATION

This application claims under 35 U.S.C. § 119 (a) the benefit of Korean Patent Application No. 10-2024-0151578 filed on Oct. 30, 2024, the entire contents of which is incorporated herein by reference.

TECHNICAL FIELD

The present disclosure relates to a hardware-embedded pointing transfer processing technique, and more specifically, to a hardware-embedded pointing transfer processing device and method capable of providing consistent pointing performance regardless of an operating system (OS) or hardware settings through a pointing transfer function embedded in hardware.

BACKGROUND

Indirect pointing devices such as a mouse play an important role in human-computer interaction, and a pointing transfer function for converting the movement of a mouse into pointer movement on a screen has a great impact on the user experience. However, operating systems provide transfer functions through fixed settings or limited presets, which may not satisfy different requirements for each user.

For example, the "mouse acceleration" function of Windows greatly affects the movement speed of a pointer felt by a user, but this setting may not be suitable for the environment or cause inconvenience for each user. In particular, in environments such as games that require very precise pointer control, default settings of operating systems may hinder the user experience.

Professional gamers, who are high-performance users, do not rely on these default OS transfer functions and prefer specific settings that can maintain consistent performance. However, among default functions of operating systems, functions that apply non-linear acceleration at various speeds may lead to inconsistent results depending on mouse hardware settings (Count per Inch—mouse sensitivity, polling rate—mouse polling rate). This can be a problem in environments in which precise manipulation that relies on muscle memory is required.

To solve this problem, some gamers try to control pointer movement with hardware settings alone, but it is still difficult to completely exclude the influence of operating system settings.

PRIOR ART LITERATURE

Patent Literature

Korean Patent Publication No. 10-2012-0050131 (May 18, 2012)

DESCRIPTION

Problem to be Solved

One embodiment of the present disclosure provides a hardware-embedded pointing transfer processing device and method capable of providing consistent pointing performance regardless of an operating system (OS) or hardware settings through a pointing transfer function embedded in hardware.

One embodiment of the present disclosure provides a hardware-embedded pointing transfer processing device and method capable of providing the same user experience regardless of changes in default settings of an operating system or hardware settings by defining a relationship between a physical speed and a speed of a pointer on a screen in physical units desired by a user in an indirect pointing device such as a mouse and embedding the same in firmware.

Solution

In view of the above, the present disclosure provides a hardware-embedded pointing transfer processing device including a user control command receiver configured to receive a user control command, a sensor configured to output mouse movement data on the basis of the control command, and a pointing data processor configured to set a user-defined gain based on the mouse movement data and provide a cancellation gain capable of canceling out a default gain provided by an operating system for the user-defined gain.

The pointing data processor may include a gain computation module configured to determine a physical movement speed of the sensor in physical units of the mouse movement data and determine a movement speed of a pointer on a screen in physical units of the mouse movement data.

The gain computation module may compute a ratio between the physical movement speed (unit:m/s) of the sensor and the movement speed (unit:px/s) of the pointer on the screen as the user-defined gain.

The pointing data processor may further include a cancellation gain determination module configured to determine the cancellation gain through a relationship between the user-defined gain and the default gain.

The cancellation gain determination module may store the cancellation gain in a memory and reflect the cancellation gain in real time whenever the mouse movement data is generated.

The pointing data processor may further include a default gain determination module configured to determine the default gain on the basis of an acceleration gain or a constant gain provided by the operating system.

The default gain determination module may compute a residual value based on the user-defined gain, the cancellation gain, and the default gain such that the gain computation module corrects an error in next input mouse movement data.

In an embodiment, a hardware-embedded pointing transfer processing method performed in a hardware-embedded pointing transfer processing device includes a user control command reception step of receiving a user control command, a sensing step for outputting mouse movement data on the basis of the control command, and a pointing data processing step of setting a user-defined gain based on the mouse movement data and providing a cancellation gain capable of canceling out a default gain provided by an operating system for the user-defined gain.

The pointing data processing step may include determining a physical movement speed of a sensor in physical units of the mouse movement data and determining a movement speed of a pointer on a screen in physical units of the mouse movement data, and computing a ratio between the physical movement speed (unit:m/s) of the sensor and the movement speed (unit:px/s) of the pointer on the screen as the user-defined gain.

The pointing data processing step may include determining the cancellation gain through a relationship between the user-defined gain and the default gain, and storing the cancellation gain in a memory and reflecting the cancellation gain in real time whenever the mouse movement data is generated.

The pointing data processing step may include determining the default gain on the basis of an acceleration gain or a constant gain provided by the operating system, and computing a residual value based on the user-defined gain, the cancellation gain, and the default gain such that a gain computation module corrects an error in next input mouse movement data.

Advantageous Effects

The disclosed technique has the following effects. However, it should be understood that the scope of the disclosed technique is not limited thereby since it does not mean that a specific embodiment must include all or only the following effects.

The hardware-embedded pointing transfer processing device and method according to the present disclosure can provide consistent pointing performance regardless of an operating system (OS) or hardware settings through a pointing transfer function embedded in hardware.

The hardware-embedded pointing transfer processing device and method according to the present disclosure can provide the same user experience regardless of changes in default settings of the operating system or hardware settings by defining a relationship between a physical speed and a speed of a pointer on a screen in physical units desired by a user in an indirect pointing device such as a mouse and embedding the same in firmware.

BRIEF DESCRIPTION OF THE DRAWINGS

FIG. 4 is a diagram illustrating customized mouse hardware used in the present disclosure.

DETAILED DESCRIPTION

Figure 1:
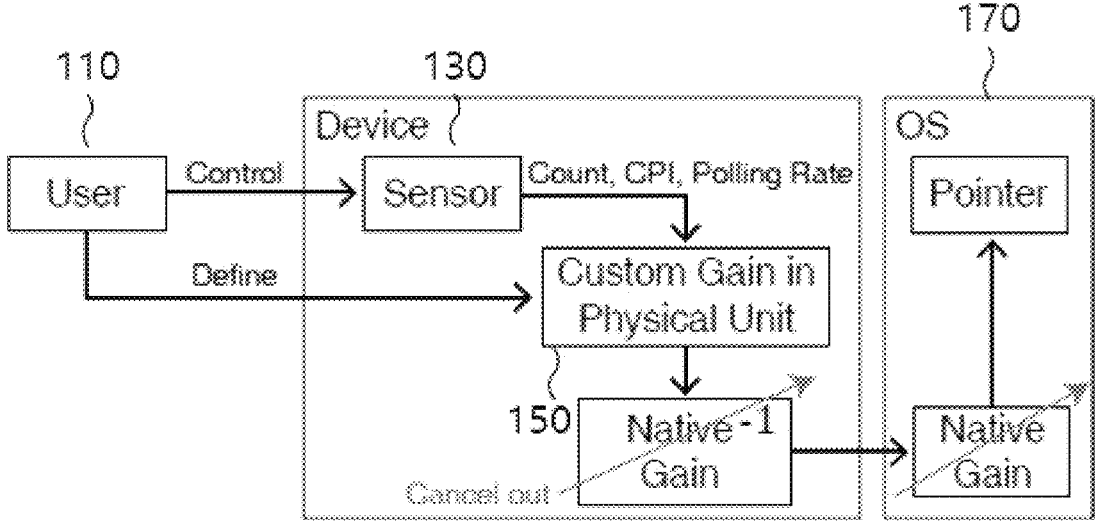
FIG. 1 is a diagram illustrating a hardware-embedded pointing transfer processing device according to the present disclosure.

Specific structural or functional descriptions in the embodiments of the present disclosure introduced in this specification or application are only for description of the embodiments of the present disclosure. The descriptions should not be construed as being limited to the embodiments described in the specification or application. The present disclosure may, however, be embodied in many different forms, but should be construed as covering modifications, equivalents or alternatives falling within ideas and technical scopes of the present disclosure. Further, since effects disclosed herein do not mean that a specific embodiment should include all or only the effects, the scope of the present disclosure should not be construed as being limited thereto.

Meanwhile, the meaning of terms described herein will be understood as follows.

It will be understood that, although the terms "first", "second", etc. may be used herein to distinguish one element from another element, these elements should not be limited by these terms. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to" or "directly adjacent to" should be construed in the same way.

In the present disclosure, the singular forms are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

In each step, reference characters (e.g. a, b, c, etc.) are used for the convenience of description. The reference characters do not designate the order of the steps, and the steps may be performed in a different order unless the context clearly indicates otherwise. That is, the steps may be performed in the specified order, may be performed substantially simultaneously, or may be performed in a reverse order.

The present disclosure can be implemented as a computer-readable code on a computer-readable recording medium. The computer-readable recording medium includes all types of recording devices in which data readable by a computer system is stored. Examples of the computer-readable recording medium include ROM, RAM, CD-ROM, magnetic tape, floppy disk, an optical data storage device, etc. In addition, the computer-readable recording medium may be distributed in a computer system connected via a network, so that computer-readable codes may be stored and executed in a distributed manner.

Unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 2:
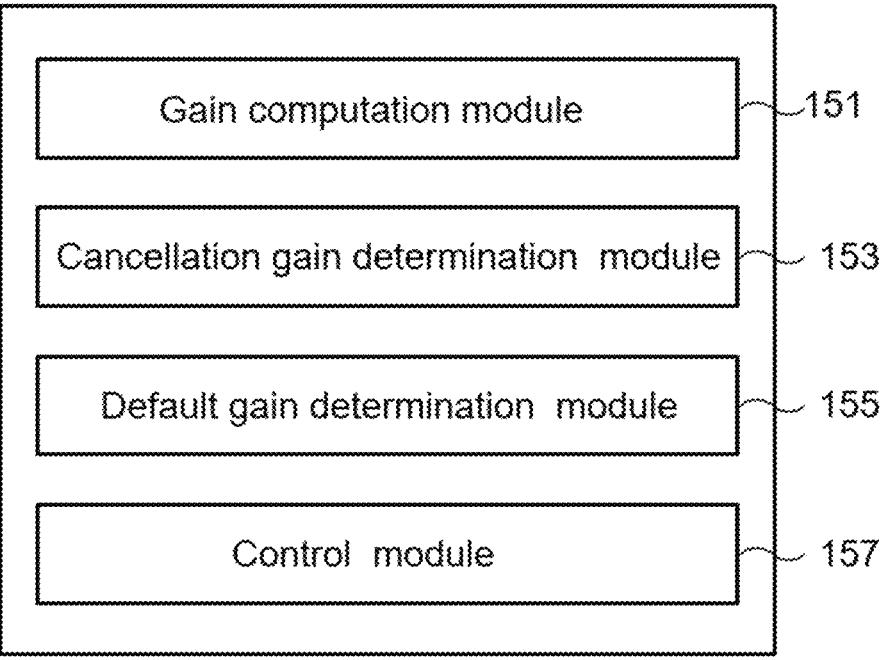
FIG. 2 is a diagram illustrating a pointing data processor of FIG. 1.

FIG. 1 is a diagram illustrating a hardware-embedded pointing transfer processing device according to the present disclosure, and FIG. 2 is a diagram illustrating a pointing data processor 150 in FIG. 1.

Referring to FIG. 1, the hardware-embedded pointing transfer processing device 100 may include a user control command receiver 110, a sensor 130, and the pointing data processor 150.

The user control command receiver 110 may receive a user control command.

The sensor 130 may output mouse movement data on the basis of the control command.

The pointing data processor 150 may set a user-defined gain based on the mouse movement data and provide a cancellation gain capable of canceling out a default gain provided by an operating system for the user-defined gain. The pointing data processor 150 may embed the user-defined gain in hardware firmware to nullify the influence of the operating system 170 or hardware settings. Specifically, the pointing data processor 150 may define a gain desired by a user as a function based on a physical speed and upload the same to the firmware to control the speed of the pointer on the screen. The user-defined gain is automatically compensated for changes in the CPI or polling rate of the hardware and can ensure that the user experiences consistent pointing performance even when the external environment changes. Accordingly, the influence of the operating system 170 or hardware settings can be minimized to provide an optimal pointing experience to high-performance users. Here, the pointing data processor 150 may be implemented through a mechanism that sets a user-defined gain in hardware and cancels the influence of operating system (OS) settings.

Referring to FIG. 2, the pointing data processor 150 may include a gain computation module 151, a cancellation gain determination module 153, a default gain determination module 155, and a control module 157.

The gain computation module 151 may determine a physical movement speed of the sensor 130 in physical units of mouse movement data and determine a movement speed of the pointer on the screen in physical units of the mouse movement data. The gain computation module 151 may compute a ratio between the physical movement speed (unit:m/s) of the sensor 130 and the movement speed (unit:px/s) of the pointer on the screen as a user-defined gain. That is, the user-defined gain may be defined as a relationship between the physical speed and the speed of the pointer on the screen. A user may design a custom curve within a specific speed range and upload the same to the firmware of the hardware. For example, an acceleration curve or a constant curve may be set. Here, a maximum physical speed $v_{max}$ is set to 1 m/s and may be finely adjusted in N (e.g., 100) divided sections within this range.

The gain computation module 151 may compute the physical movement speed of the sensor 130 on the basis of mouse movement data. Here, the mouse movement data is recorded every 1/P seconds in accordance with a polling rate P and counts per inch (CPI), and the physical movement speed $v_i$ of the sensor 130 may be computed by the following mathematical expression 1 through x- and y-axis values $c_x$ and $c_y$ measured by the sensor 130.

$$v_i = 0.0254 \times \frac{P}{CPI} \times \sqrt{c_x^2 + c_y^2} \qquad \text{[Mathematical expression 1]}$$

Here, 0.0254 is a constant for converting inches to meters, and CPI is the currently set mouse sensitivity.

The cancellation gain determination module 153 may determine a cancellation gain through the relationship between a user-defined gain and a default gain. The cancellation gain determination module 153 may store the cancellation gain in a memory and reflect the same in real time whenever mouse movement data is generated. Here, the default gain is defined as a logical unit instead of a physical unit, and the performance thereof may be distorted by changes in hardware settings. To solve this, the cancellation gain determination module 153 may determine the cancellation gain for canceling out the default gain provided by the operating system 170 and reflect the cancellation gain in mouse movement data. Whenever mouse movement data is generated, the cancellation gain determination module 153 may compare the size of the data with a result of applying the default gain of the operating system 170 and determine the cancellation gain for canceling out the two values.

The default gain determination module 155 may determine the default gain on the basis of an acceleration gain or a constant gain provided by the operating system 170. The default gain determination module 155 may compute a residual value on the basis of the user-defined gain, the cancellation gain, and the default gain such that the gain computation module 151 can correct an error in the next mouse movement data input thereto. This can enable accurately controlled pointer movement.

The control module 157 may control the overall operation of the pointing data processor 150 and manage a control flow or a data flow between the gain computation module 151, the cancellation gain determination module 153, and the default gain determination module 155.

Figure 3:
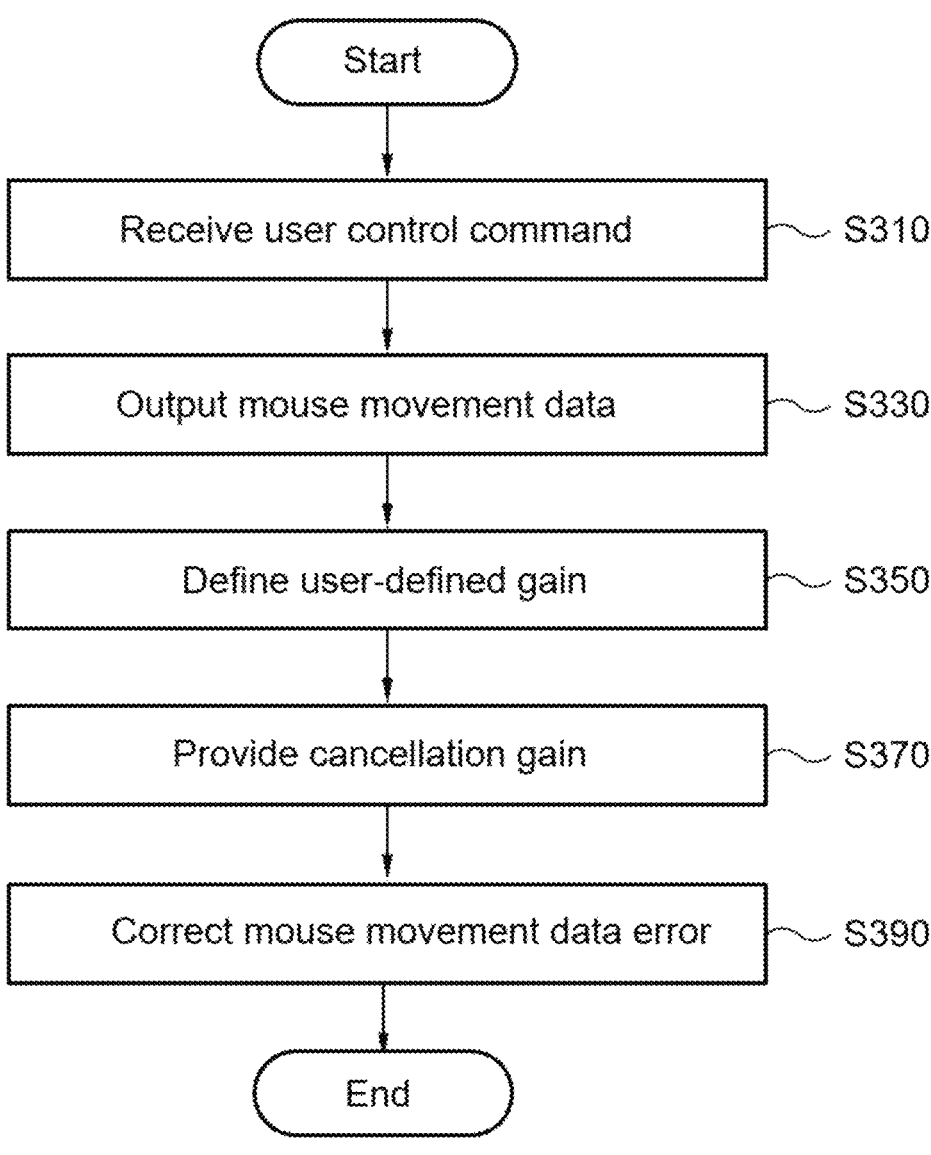
FIG. 3 is a flowchart illustrating a hardware-embedded pointing transfer processing method according to the present disclosure.

FIG. 3 is a flowchart illustrating a hardware-embedded pointing transfer processing method according to the present disclosure.

Referring to FIG. 3, the hardware-embedded pointing transfer processing device 100 may receive a user control command through the user control command receiver 110 (step S310). The hardware-embedded pointing transfer processing device 100 may output mouse movement data on the basis of the control command through the sensor 130 (step S330).

In addition, the hardware-embedded pointing transfer processing device 100 may set a user-defined gain on the basis of the mouse movement data through the pointing data processor 150 (step S350). The pointing data processor 150 may perform a step of determining a physical movement speed of the sensor 130 in physical units of the mouse movement data and determining a movement speed of the pointer on the screen in physical units of the mouse movement data and a step of computing a ratio between the physical movement speed (unit: m/s) of the sensor 130 and the movement speed (unit:px/s) of the pointer on the screen as a user-defined gain through the gain computation module 151.

In addition, the hardware-embedded pointing transfer processing device 100 may provide a cancellation gain capable of canceling out the default gain provided by the operating system for the user-defined gain through the pointing data processor 150 (step S370). The pointing data processor 150 may perform a step of determining the cancellation gain through the relationship between the user-defined gain and the default gain and a step of storing the cancellation gain in the memory and reflecting the same in real time whenever mouse movement data is generated through the cancellation gain determination module 153. Here, the default gain may be determined on the basis of an acceleration gain or a constant gain provided by the operating system 170.

In addition, the hardware-embedded pointing transfer processing device 100 may compute a residual value on the basis of the user-defined gain, the cancellation gain, and the default gain to correct an error in next input mouse movement data through the pointing data processor 150 (step S390).

Hereinafter, the hardware-embedded pointing transfer processing device and method according to the present disclosure will be described in more detail with reference to FIGS. 4 to 13.

At the time of using an indirect pointing device, the pointing transfer function may vary depending on hardware or operating system (OS) default settings, and thus a user may have difficulty finding and adapting to a desired optimal transfer function. Accordingly, the present disclosure proposes a hardware-embedded pointing transfer processing technique that allows a user to define a desired function in a physical unit in device firmware such that the user can experience a consistent transfer function even when hardware or operating system settings are changed, and removes the influence of changes in the operating system (OS) default functions and hardware settings such that uploaded functions are maintained regardless of external environments.

The technique according to the present disclosure can be implemented through a computer mouse, which is a widely used input device among various indirect pointing devices. To this end, mouse hardware and firmware are implemented as shown in FIG. 4.

Figure 4:
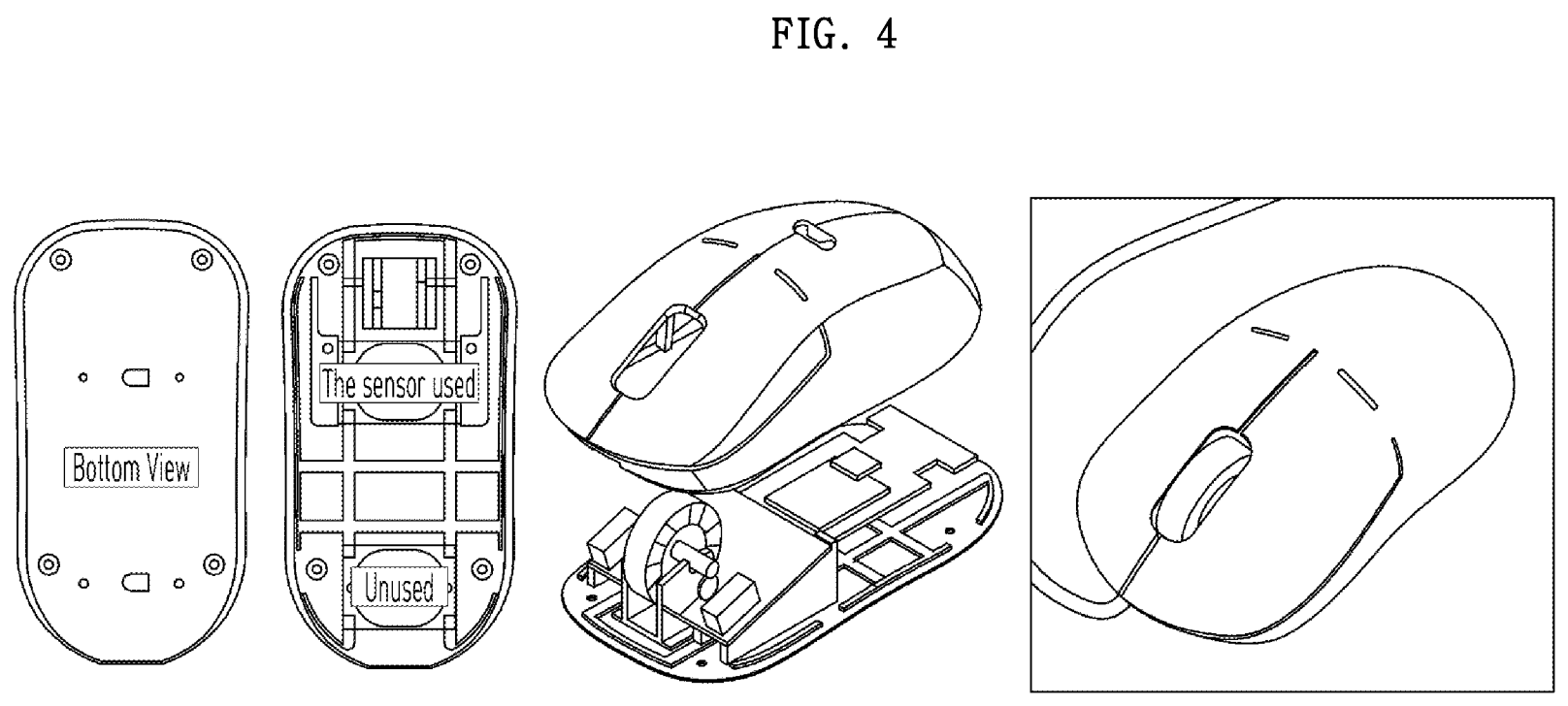

FIG. 4 is a diagram showing customized mouse hardware used in the present disclosure.

Referring to FIG. 4, the customized mouse used in the present disclosure is a dual sensor mouse manufactured based on open source 3D printer drawing and Arduino source code. Here, only one sensor, which is closer to a fingertip, between two sensors is used.

Mouse driving firmware is implemented using Arduino IDE. A microcontroller (MCU) reads a displacement value of the PWM3389 sensor through SPI communication, processes sensor data, and transmits a USB human interface device (HID) report to a host computer. A USB HID descriptor is extended to report x and y displacements in 16 bits instead of the standard 8 bits, and accordingly, a range from −32,768 to 32,768 can be handled.

Figure 5:
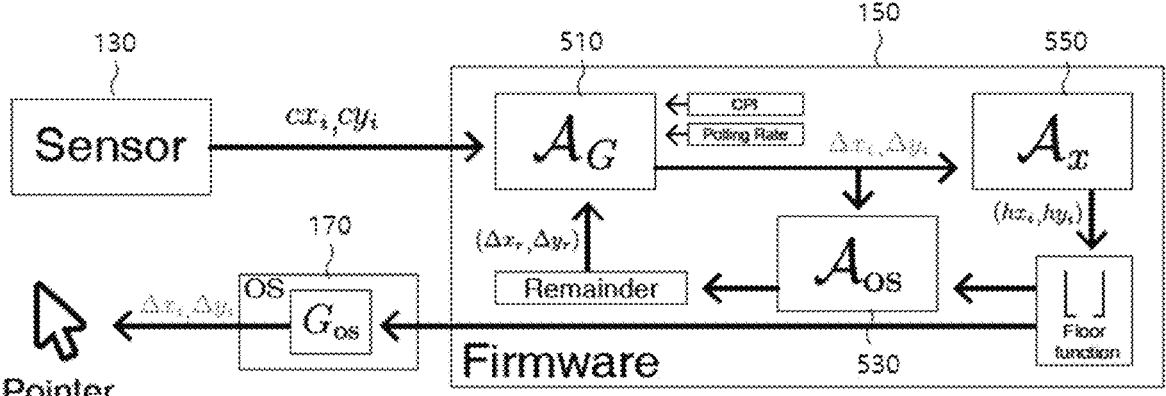
FIG. 5 is a diagram illustrating a firmware configuration of the hardware-embedded pointing transfer processing device according to the present disclosure.

FIG. 5 is a diagram showing a firmware configuration of the hardware-embedded pointing transfer processing device according to the present disclosure.

In FIG. 5, the hardware-embedded pointing transfer processing device 100 according to the present disclosure may define the relationship between a physical movement speed of the mouse and a movement speed of the pointer on the screen as a user-defined gain, that is, a pointing gain function G(v) desired by the user. When the mouse is moved at a speed v (unit: m/s), the movement speed s (unit:px/s) of the pointer on the screen can be determined by the following mathematical expression 2.

$$s = G(v) \cdot v \qquad \text{[Mathematical expression 2]}$$

Here, the unit of the user-defined gain G(v) is px/m, which represents the amount of pixels px that the pointer is moved on the screen per physical distance m. The maximum physical speed of the mouse is set to $v_{max}$, and the gain function is divided into N sections and uploaded to the firmware in the form of an array 510 as represented by the following mathematical expression 3.

$$_c A_G = \left[ G(0), G\!\left(\frac{v_{max}}{N}\right), \right. \qquad \text{[Mathematical expression 3]}$$
$$\left. G\!\left(\frac{2v_{max}}{N}\right), \dots , G(v_{max}) \right]$$

Figure 6:
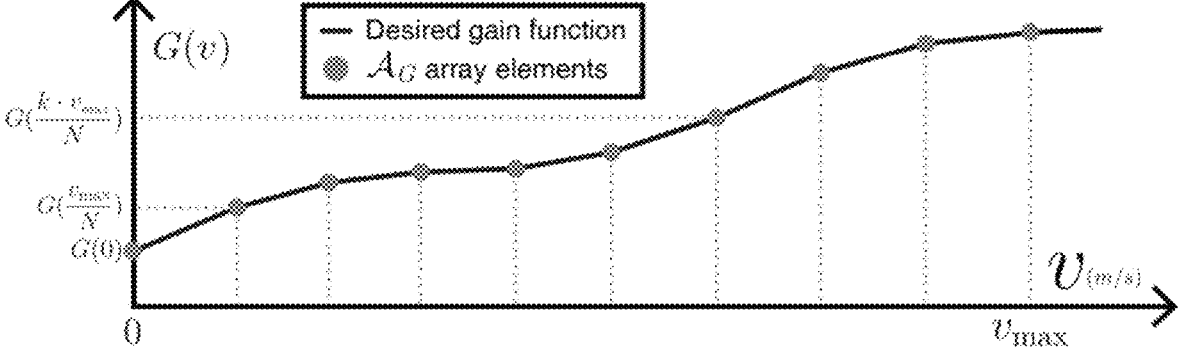
FIG. 6 is a diagram illustrating user-defined gain setting according to the present disclosure.

FIG. 6 is a graphical representation depicting the configuration of the user-defined gain according to the present disclosure.

In the case of FIG. 6, the maximum physical speed $v_{max}$ of the mouse is set to 1 m/s, N is set to 100, and a user-defined gain function is divided into 100 sections such that it can be finely adjusted.

The physical speed v of the mouse can be precisely estimated by analyzing readings of the sensor 130. If the polling rate of the mouse is represented as P (unit: Hz), sensor readings are obtained every 1/P seconds. Assuming the i-th readings of the sensor 130 as $cx_i$ and $cy_i$ (unit: counts) on the x-axis and y-axis, a mouse speed estimate $\hat{v}_i$ at that moment can be computed by the following mathematical expression 4.

$$\hat{v}_i = 0.0254 \cdot \frac{P\sqrt{cx_i^2 + cy_i^2}}{CPI} \qquad \text{[Mathematical expression 4]}$$

Here, CPI is mouse sensitivity setting at the time when sensor readings are generated. 0.0254 is a proportional constant introduced to convert inches to meters.

A gain $G_i$ to be applied to the i-th sensor readings $cx_i$ and $cy_i$ can be obtained by linear interpolation using the fractional index corresponding to the estimated speed $\hat{v}_i$ in the transfer function array. According to the definition of the gain function in the mathematical expression 2 above, the pointer speed $s_i$ on the screen to be generated from the i-th sensor readings may be determined by the mathematical expression 5 below.

$$s_i = G_i V \cdot \hat{v}_i \qquad \text{[Mathematical expression 5]}$$

Each sensor reading is performed for 1/P (unit: seconds), where P is the polling rate (Hz) of the mouse. In order to move the pointer on the screen at the average speed $s_i$ obtained from the above mathematical expression 5, the corresponding distance $d_i$ of the pointer moving on the screen may be computed as in the following mathematical expression 6.

$$d_i = \frac{s_i}{P} \qquad \text{[Mathematical expression 6]}$$

The hardware-embedded pointing transfer processing device 100 according to the present disclosure may compute how much the pointer on the screen should be moved for each sensor reading to compute a user-defined gain. In particular, since the firmware internally automatically compensates for the influence of hardware settings such as CPI or polling rate as in the above mathematical expression 4, even if the hardware settings change, the user can always experience the same transfer function in physical units.

In the process of moving the pointer in the operating system (170), first, the input device (e.g., mouse) transmits a human interface device (HID) report in the form of an integer vector $(hx_i, hy_i)$ to the operating system 170 through a USB bus in an i-th sensor reading step. Then, the operating system 170 computes the size of the report (i.e., the length of the vector) $|h_i|$ and multiplies the same by the default gain $G_{OS}$ to determine a pixel movement amount $(\Delta x_i, \Delta y_i)$ of the pointer. Finally, the computed movement amount $(\Delta x_i, \Delta y_i)$ is reflected in the pointer position on the screen. That is, when the user moves the mouse, the pointer on the screen also moves appropriately. The relationship between the pointer movement vector and the HID report vector may be represented as the following mathematical expression 7.

$$(\Delta x_i, \Delta y_i) = G_{os}(|h_i|) \cdot (hx_i, hy_i) \qquad \text{[Mathematical expression 7]}$$

Here, the default gain function $G_{OS}$ can compute the size of the HID report received as input through a method other than the general Euclidean norm. For example, in Windows, the size $|h_i|$ of the HID report may be computed in a unique method of $max(hx_i, hy_i) + min(hx_i, hy_i)/2$. According to this expression, the size is computed by summing half of a maximum movement amount and half of a minimum movement amount in both axes.

On the assumption that the default gain function $G_{OS}$ is uploaded to the mouse in the form of an array, similar to the user-defined gain G, the array 530 of the default gain function may be represented as in the following mathematical expression 8 when the maximum HID report size is set to $h_{max}$.

$$\mathcal{A}_{OS} = \left[ G_{OS}(0), G_{OS}\left(\frac{h_{max}}{N_{OS}}\right), \right. \qquad \text{[Mathematical expression 8]}$$
$$\left. G_{OS}\left(\frac{2h_{max}}{N_{OS}}\right), \cdots, G_{OS}(h_{max}) \right]$$

Here, $N_{OS}$ is set to 1,000, $G_{os}(0)$ is set to 0, and $h_{max}$ is set to 500.

The distance $d_i$ of the pointer moving on the screen derived from the above mathematical expression 6 may be represented as the following mathematical expression 9 in relation to the default gain.

$$d_i = \sqrt{\Delta x_i^2 + \Delta y_i^2} = G_{OS}(|h_i|) \cdot |h_i| \qquad \text{[Mathematical expression 9]}$$

Figure 7:
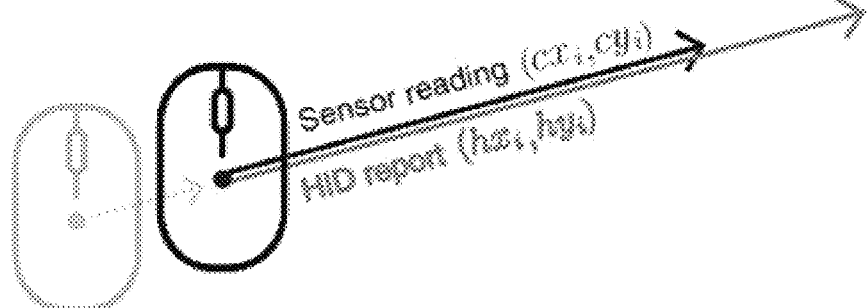
FIG. 7 is a diagram visually illustrating sensor reading and direction setting of an HID report.

FIG. 7 is a diagram visually showing sensor reading and direction setting of the HID report.

In the case of FIG. 7, in order to prevent the user from recognizing a directional jitter in pointer movement, the integer vector $(hx_i, hy_i)$ of the HID report needs to be set parallel to a sensor readings $c_i = (cx_i, cy_i)$. The directional jitter means a phenomenon in which the pointer does not move smoothly but shakes or vibrates irregularly. Therefore, the integer vector $(hx_i, hy_i)$ of the HID report may be determined by multiplying the sensor readings $cx_i$ and $cy_i$ by a constant $k_i$ as in the following mathematical expression 10.

$$(hx_i, hy_i) = k_i \cdot (cx_i, cy_i) \qquad \text{[Mathematical expression 10]}$$

If the size of the sensor measured values $cx_i$ and $cy_i$ is represented as $|c_i|_{OS}$ and the Euclidean norm is represented as $|c_i|_E$, the above mathematical expression 9 can be converted into the form of the following mathematical expression 11.

$$d_i = G_{os}(k_i \cdot |c_i|_{os}) \cdot k_i \cdot |c_i|_E \qquad \text{[Mathematical expression 11]}$$

Here, if $k_i \cdot |c_i|_{OS}$ is replaced with x, the x coordinate can be obtained by computing the intersection of the two functions. When the intersection x value obtained for a specific K is $x^*_K$, these values may be made into an array and uploaded to the firmware. In this case, the array 550 may be stored in the form of the following mathematical expression 12.

$$\mathcal{A}_x = \left[ x_0^*, x^*_{\frac{K_{max}}{N_d}}, \right. \qquad \text{[Mathematical expression 12]}$$
$$\left. x^*_{\frac{2K_{max}}{N_d}}, \cdots, x^*_{K_{max}} \right]$$

Here, $K_{max}$ is set to 500 as a desired maximum K value, and $N_d$ is set to 1,000 to adjust the size of the array.

The hardware-embedded pointing transfer processing method according to the present disclosure can cancel the influence of the operating system default gain and move the pointer as desired without installing additional client software by uploading the user-defined gain array $\mathcal{A}_G$ 510, the default gain array $\mathcal{A}_{OS}$ 530, and the cancellation gain array $\mathcal{A}_x$ 550 to the firmware.

The hardware-embedded pointing transfer processing method according to the present disclosure may compute a desired pointer movement amount $d_i$ from the i-th sensor readings using the mathematical expressions 4 to 6 above, and then compute a desired pointer movement vector $(\Delta x_i, \Delta y_i)$ parallel to the sensor reading vector $(cx_i, cy_i)$ as represented by the following mathematical expression 13.

$$\mathcal{A}_x = \left[ x_0^*, x^*_{\frac{K_{max}}{N_d}}, \right. \qquad \text{[Mathematical expression 13]}$$
$$\left. x^*_{\frac{2K_{max}}{N_d}}, \cdots, x^*_{K_{max}} \right]$$

If the residual value of the pointer movement vector that has not been processed in previous sensor reading is $(\Delta x_r, \Delta y_r)$, this value may be added to the pointer movement vector $(\Delta x_i, \Delta y_i)$ to be processed in the current step, and then included in the residual value to update the desired pointer movement amount vector $d_i$ as in the following mathematical expression 14.

$$d_i \leftarrow |(\Delta x_i, \Delta y_i)|_E \qquad \text{[Mathematical expression 14]}$$

Next, the value K is computed and interpolation is used to get corresponding $x^*_i$ value from the $\mathcal{A}_x$ array 550.

Finally, the HID report to be sent to the operating system 170 according to the above mathematical expression 10 may be computed as the following mathematical expression 15.

$$(hx_i, hy_i) \leftarrow k_i(cx_i, cy_i) \qquad \text{[Mathematical expression 15]}$$

However, since the operating system 170 allows only HID reports with integer elements, the HID report vector computed in the above mathematical expression 15 passes through the floor function $\lfloor x \rfloor$ and is transferred to the operating system 170. The loss of pointer movement amount that has occurred at this time is computed using the $\mathcal{A}_{OS}$ array 530 based on the above mathematical expression 7, and this may be set as a residual value to be processed during the next sensor reading.

The hardware-embedded pointing transfer processing method according to the present disclosure uploads the user-defined gain to the firmware, and the firmware may perform computations according to the above mathematical expressions on each piece of sensor data to maintain user experience. The hardware-embedded pointing transfer processing method according to the present disclosure may generate an array of each gain and store the same in the firmware to process sensor data in real time in order to efficiently cancel out the user-defined gain and the default gain.

Two experiments were conducted to evaluate whether the method proposed in the present disclosure operates consistently under various OS gain functions and hardware settings. In the first experiment, pointer movement was measured under various hardware settings and OS default gain function combinations in order to verify that a target transfer function was implemented accurately. In the second experiment, an experiment in which a professional gamer and a general user subjectively evaluate the performance was conducted.

The experiments were performed independently under baseline conditions and conditions of the method proposed in the present disclosure. The same mouse was used for both experiments, and in the baseline conditions, sensor readings of the mouse were directly transmitted to the OS as an HID report like a conventional mouse. In the conditions of the method proposed in the present disclosure, the experiment was conducted by implementing mouse firmware.

Baseline experimental levels are as follows.

Native function: C2, A2, C6, A6, C10, A10

CPI: 400 or 800

Polling rate (Hz): 125 or 250

Figure 8:
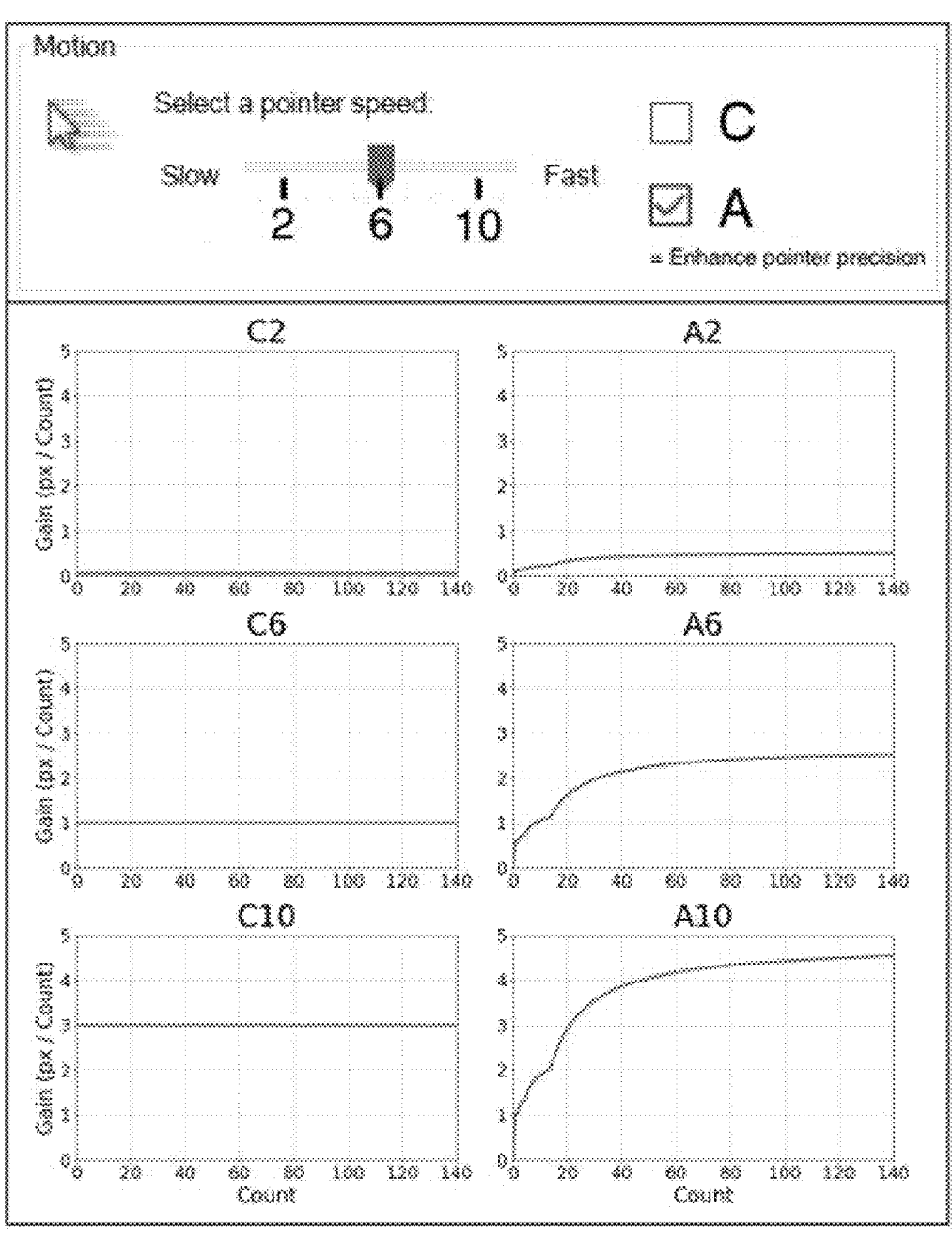
FIG. 8 is a diagram illustrating native functions used in baseline experiments.

FIG. 8 is a diagram showing native functions of six levels used under the baseline conditions. The native function means the default gain setting of the OS (Windows) running during the experiments, C represents a constant gain, and A represents an acceleration gain.

The experimental levels of the method proposed in the present disclosure are as follows.

Shape: constant, sigmoid, sine or zigzag

Scale: low, mid, high

Native function: C2, A2, C6, A6, C10, A10

CPI: 400 or 800

Polling rate (Hz): 125 or 250

Figure 9:
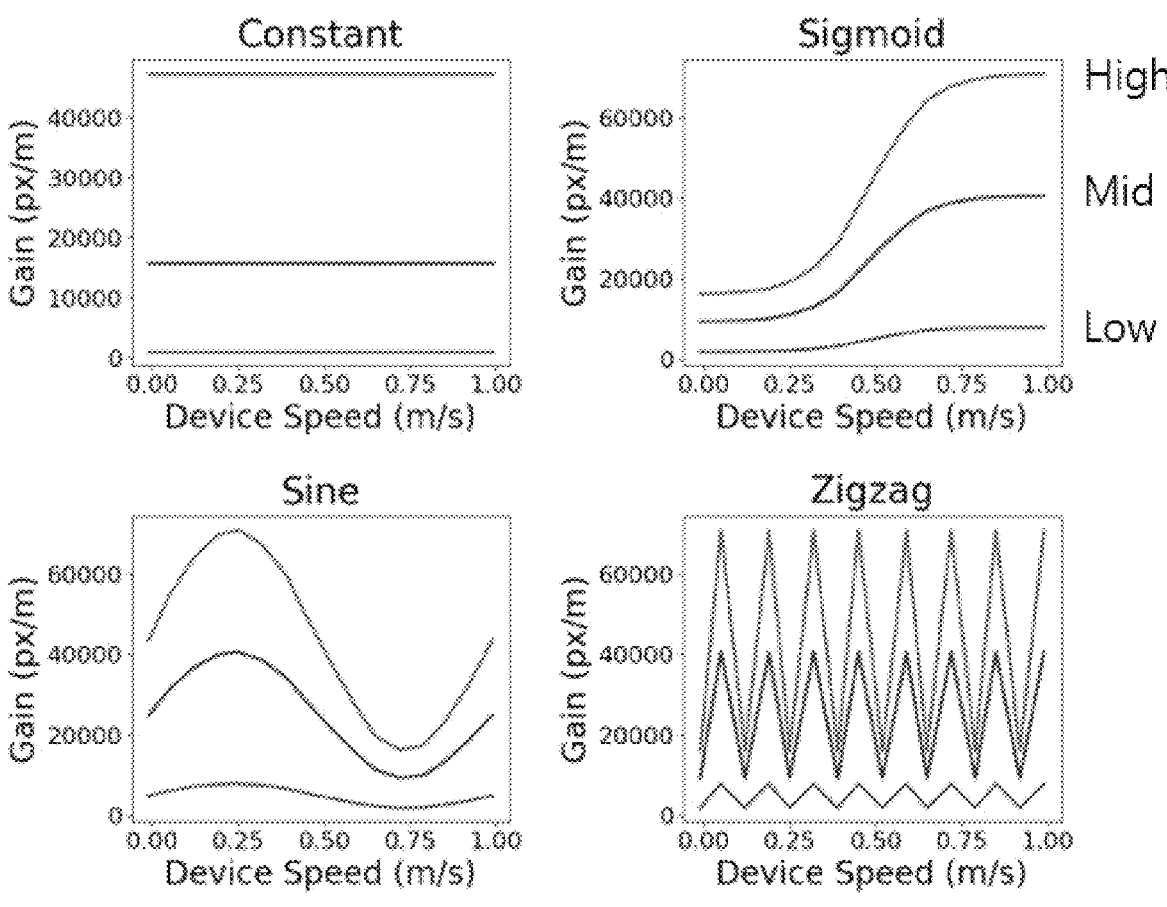
FIG. 9 is a diagram illustrating gain functions used in experimental conditions of the method proposed in the present disclosure.

FIG. 9 is a diagram showing gain functions generated by 12 scale and shape combinations used in the conditions of the present disclosure, where the shape represents the shape of a gain function, and the scale represents the amplitude of a desired gain function. Low, medium, and high conditions of the scale were determined by referring to the ranges of the native functions A2, A6, and A10.

Furthermore, in additional experiments, the CPI and polling rate of the device were randomly changed every second during mouse movement, and the experimental conditions were set to one of the following four conditions.

[CPI, polling rate]=[400, 125], [400, 250], [800, 125], [800, 250]

In additional experiments, the shape and scale of a desired gain function were fixed to Sigmoid_Mid, and the native function was fixed to the A6 condition. This experiment was conducted to evaluate whether the proposed method can robustly reproduce a desired gain function even under unintended disturbances in hardware settings such as CPI or polling rate. During data collection, the mouse was moved randomly on a desk under the experimental conditions of the baseline and the present disclosure.

As experimental results, an intended pointer movement amount $d_{intend}$ was obtained by multiplying the mouse speed $\hat{v}$ measured by the firmware by an actual desired gain $G(\hat{v})$. Under the baseline conditions, $d_{intend}$ was obtained by multiplying the operating system (OS) default gain corresponding to the size of sensor readings. The actual pointer movement amount $d_{screen}$ on the screen was instantaneously measured and compared with $d_{intend}$.

There may be a delay between pointer coordinate data and data sent from the mouse firmware (mouse speed and HID report). A delay time for each condition was estimated by cross-correlation delay between pointer coordinates and HID report data after sampling. On average, a time delay of 2.3 ms ($\sigma$=2.2) was observed, and the two pieces of data were synchronized in each condition. The pointer coordinate data is converted into pointer movement amount $d_{screen}$ data by subtracting adjacent rows, whereas $d_{instend}$ data can be obtained directly by multiplying the recorded mouse speed $\hat{v}$ or the magnitude of the sensor readings $|(cx, cy)|_E$ by a desired gain value $G(\hat{v})$ or $G_{OS}$ ($|(cx, cy)|_{OS}$. When the pointer contacts the screen edge, pointer movement due to the HID report may not be completely achieved, which can act as a significant noise in the experimental results. Therefore, data measured during the pointer contacting the screen edge and data measured before and after the contact were considered as outliers and excluded from the analysis.

Figure 10:
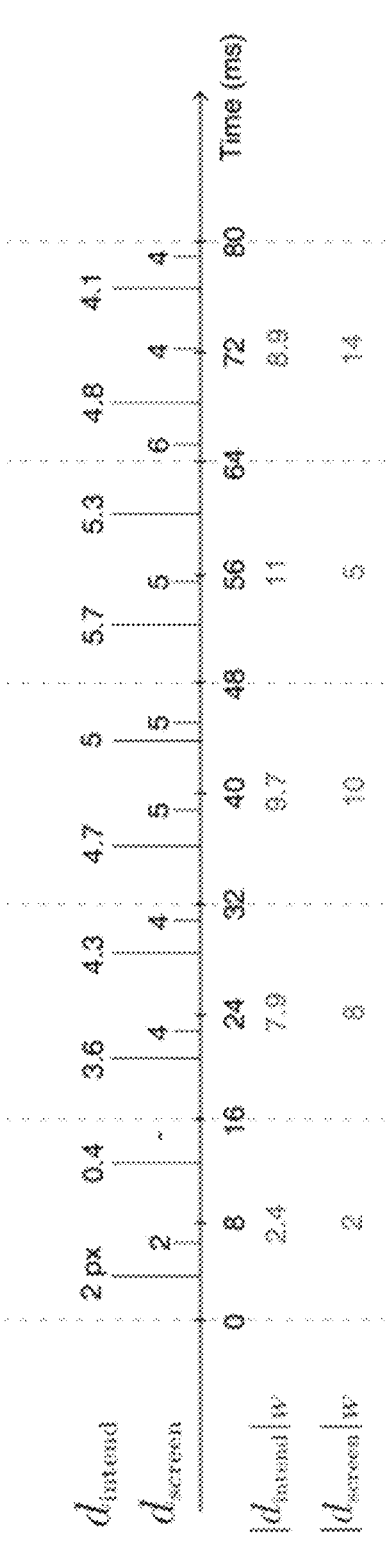
FIG. 10 is a diagram showing accumulation of a user-defined pointer movement amount and an actual pointer movement amount within a time window.

Since the pointer coordinate data and the data transmitted from the firmware are measured at different sampling rates, there may not always be a comparable pair $d_{instend}$ and $d_{screen}$. Therefore, a method in which $d_{instend}$ data sampled at a high frequency determines $d_{screen}$ sampled at a low frequency is focused. As shown in FIG. 10, $d_{instend}$ and $d_{screen}$ were divided evenly into time windows of a length of W-ms, and then the sum of $d_{instend}$ and $d_{screen}$, $|d_{instend}|_W$ and $|d_{instend}|_W$, are computed within the time windows. In the case of FIG. 10, the time window W is set to 16 ms such that at least two pointer coordinates can be included in each time window in consideration of the sampling rate (125 Hz or 250 Hz) at which pointer coordinates are collected.

To evaluate the agreement between $|d_{instend}|_W$ and $|d_{instend}|_W$, two measures are introduced. The first measure is the correlation between the two values. For each condition, linear regression is performed on all ($|d_{instend}|_W$, $|d_{instend}|_W$) points, and the regression equation and coefficient of determination $R^2$ are analyzed. The second measure is the difference between $|d_{instend}|_W$ and $|d_{instend}|_W$, that is, an error that occurs in achieving a desired pointer movement amount. The mean absolute error (MAE, unit: pixel) is computed for all ($|d_{instend}|_W$, $|d_{instend}|_W$) pairs.

As a result, there are no significant differences between the coefficients of determination, $R^2$, and MAEs of the baseline and the present disclosure as follows.

Baseline R$^2$=0.9666 (σ=0.0400), MAE=5.0020 (σ=5.8621), Disclosure R$^2$=0.9692 (σ=0.0341), MAE=4.6514 (σ=4.4401).

The average slope and intercept of the regression equation are as follows.

Baseline slope 0.9644 (σ=0.0361) and intercept 3.6276 (σ=4.6703), Disclosure slope 0.9436 (σ=0.0388) and intercept 4.7642 (σ=4.4972).

Figure 11A:
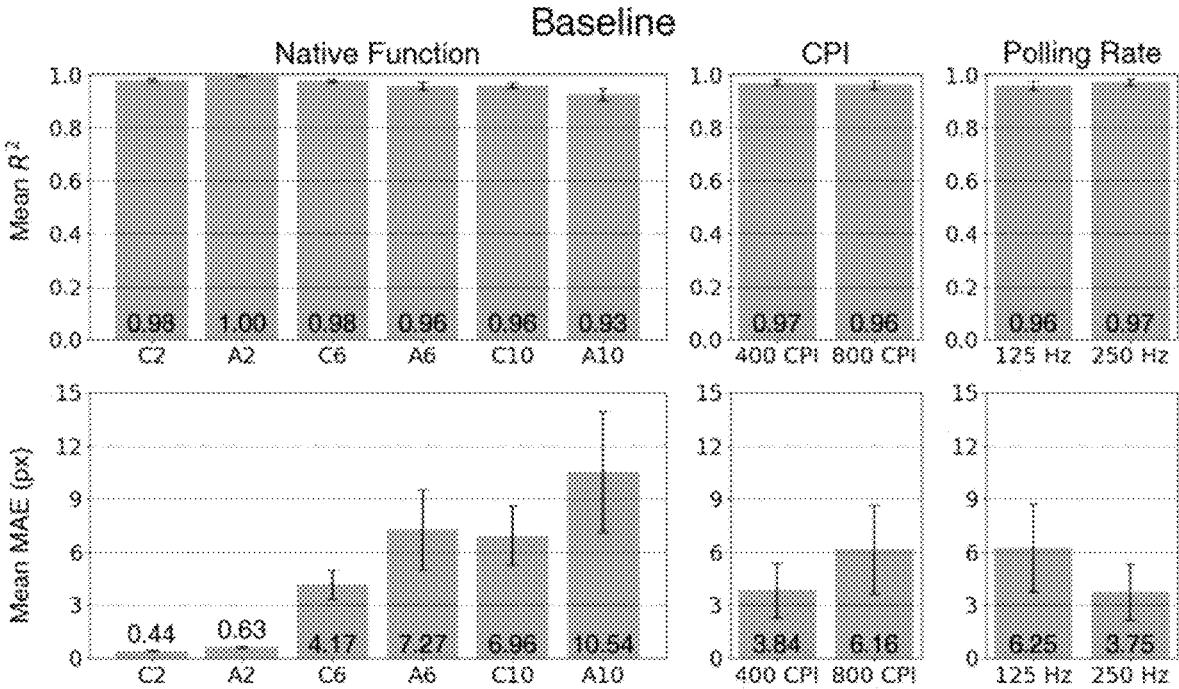
FIGS. 11A and 11B are diagrams showing the effects of independent variables of a baseline and the present disclosure on $R^2$ and MAE.
Figure 11B:
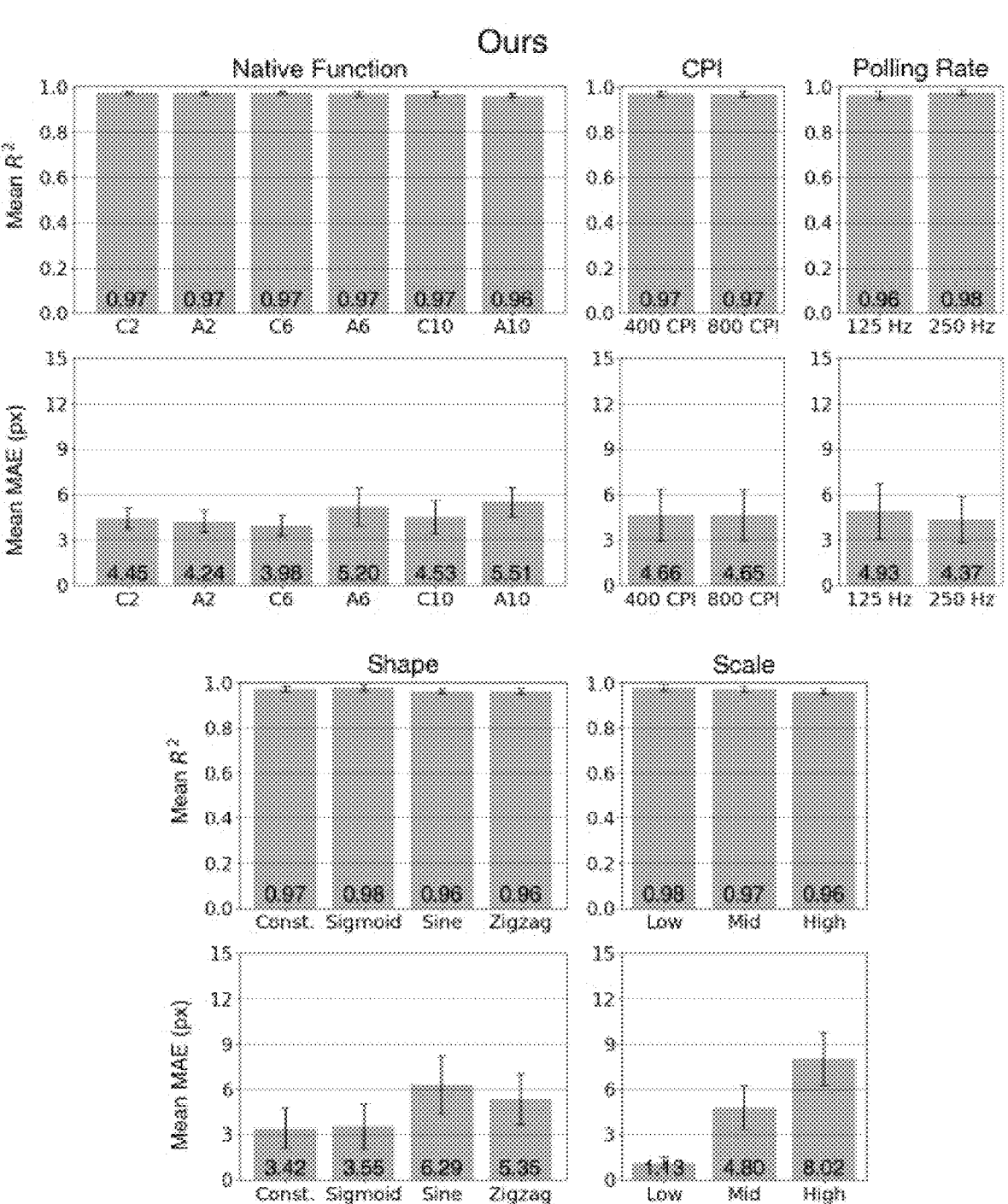

FIGS. 11A and 11B show the effects of independent variables of the baseline and the present disclosure on R$^2$ and MAE.

Figure 12:
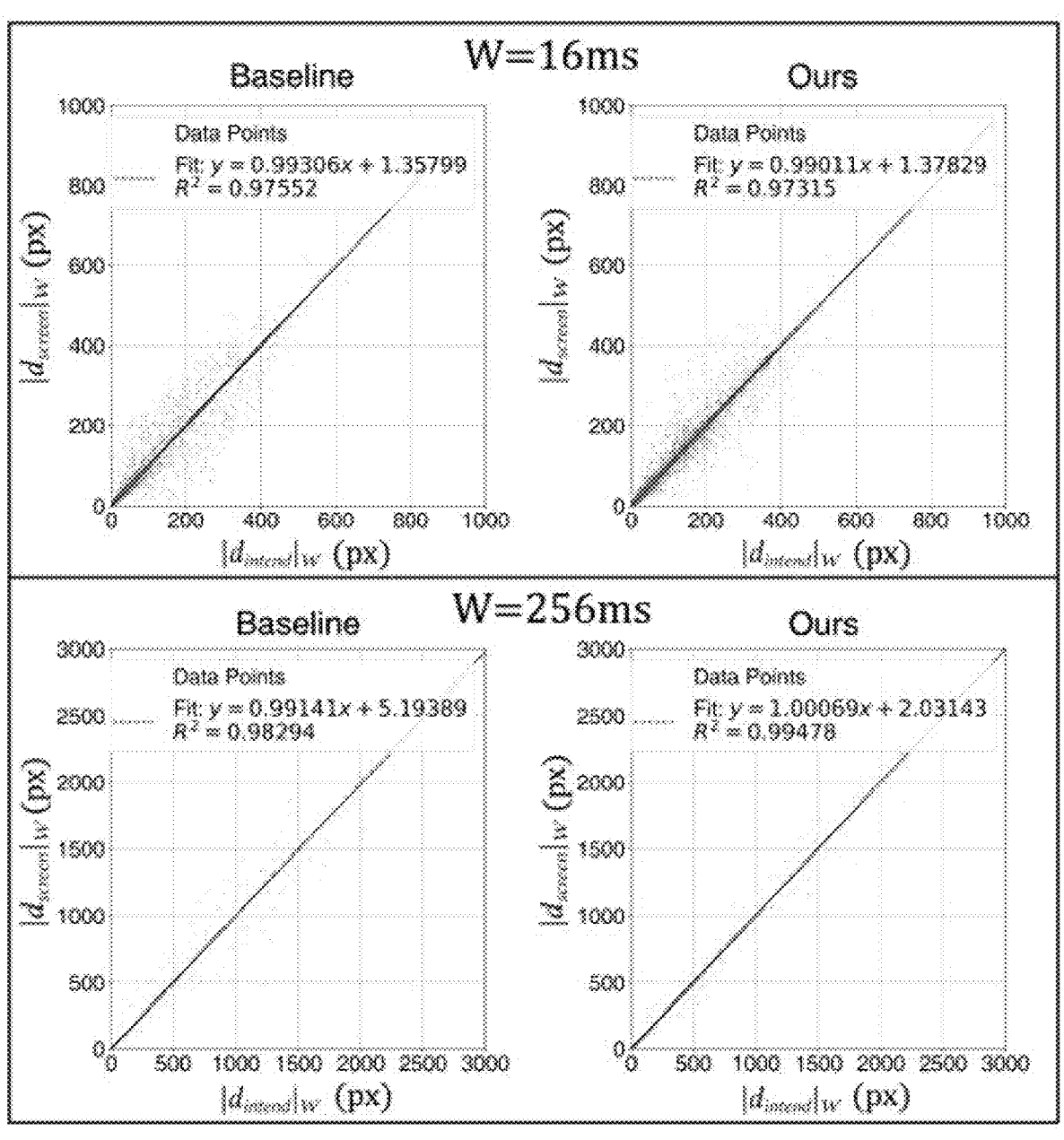
FIG. 12 is a diagram showing random sampling of pairs of user-defined pointer movement amounts and actual pointer movement amounts within the same number of time windows for the baseline and the present disclosure.

Further, for all conditions, the same number of ($|d_{instend}|_W$, $|d_{instend}|_W$) pairs were randomly sampled, as shown in the scatter plots of FIG. 12. In the case of FIG. 12, the commonly observed noise in both the baseline and the present disclosure conditions can be presumed to be due to the fact that the measurement delay between $d_{instend}$ and $d_{screen}$ during a single measurement slightly varies in real time even after pre-synchronization. This stochastic noise may lead to one more or one less data point included in a 16 ms time window, which can lead to inaccurate computations of $|d_{instend}|_W$ and $|d_{instend}|_W$, resulting in R$^2$ decrease and MAE increase. In particular, this noise can be amplified in proportion to the pointer speed, and in fact, it is observed that R$^2$ decreases and MAE increases as the total magnitude of the processed gain increases in both the baseline and the present disclosure conditions (refer to A10 condition in FIG. 11A and High condition in FIG. 11B). When the time window size is increased to 256 ms, noises in the scatter plots are reduced in proportion to the displacement size, which supports the idea that noise is caused by a measurement delay.

As a result of analysis of data measured under the condition in which the CPI and polling rate are randomly changed every second using the same method, R$^2$ and MAE are still indistinguishable from the baseline. There is no noticeable abnormality in pointer movement even when the hardware settings were automatically changed.

Figure 13:
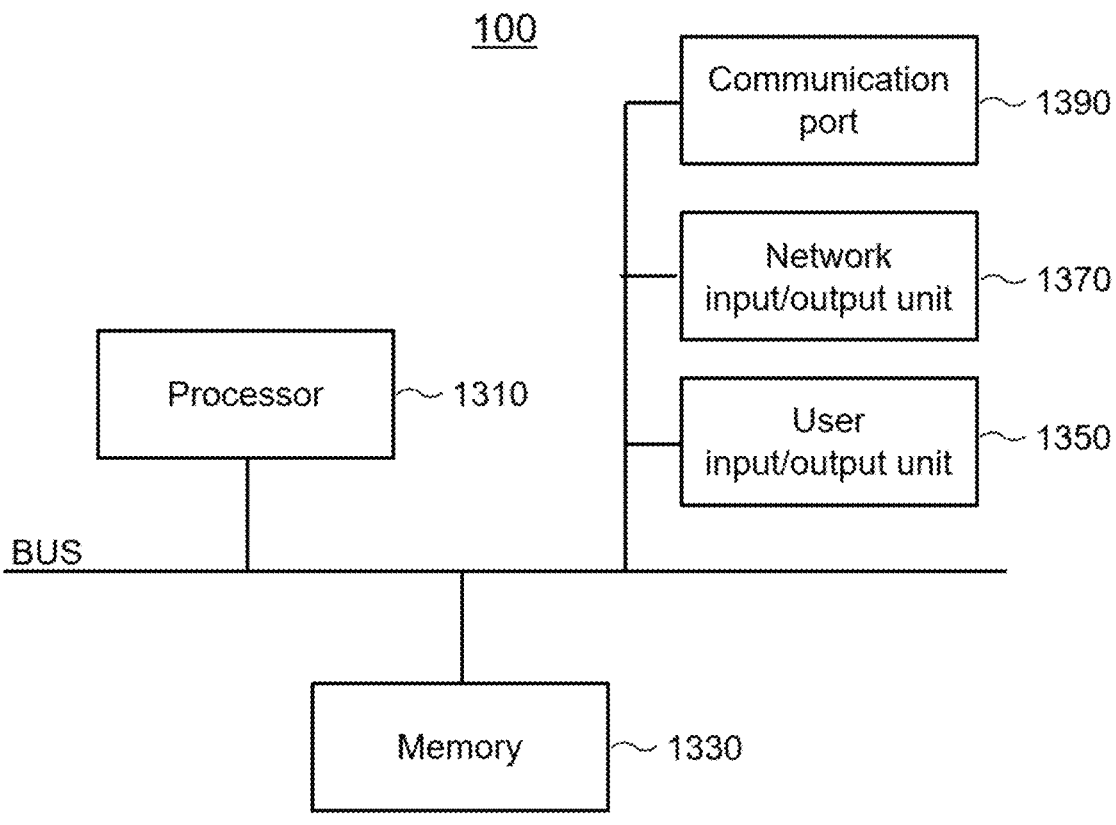
FIG. 13 is a diagram illustrating a system configuration of the hardware-embedded pointing transfer device according to the present disclosure.

FIG. 13 is a diagram illustrating a system configuration of the hardware-embedded pointing transfer processing device according to the present disclosure.

Referring to FIG. 13, the hardware-embedded pointing transfer processing device 100 may include a processor 1310, a memory 1330, a user input/output unit 1350, a network input/output unit 1370, and a communication port 1390.

The processor 1310 may execute a hardware-embedded pointing transfer processing procedure according to the present disclosure, manage the memory 1330 read or written in this process, and schedule a synchronization time between a volatile memory and a nonvolatile memory in the memory 1330. The processor 1310 may control the overall operation of the hardware-embedded pointing transfer processing device 100 and may be electrically connected to the memory 1330, the user input/output unit 1350, the network input/output unit 1370, and the communication port 1390 to control a data flow therebetween. The processor 1310 may be implemented as a central processing unit (CPU) of the hardware-embedded pointing transfer processing device 100.

The memory 1330 may include an auxiliary memory device that is implemented as a nonvolatile memory such as a solid state drive (SSD) or a hard disk drive (HDD) and used to store data required for the hardware-embedded pointing transfer processing device 100, and may include a main memory device implemented as a volatile memory such as a random access memory (RAM). In addition, the memory 1330 may store a set of instructions for executing the hardware-embedded pointing transfer processing method according to the present disclosure by being executed by the processor 1310 electrically connected thereto.

The user input/output unit 1350 may include an environment for receiving user input and an environment for outputting specific information to the user, and may include, for example, an input device including an adapter such as a touch pad, a touch screen, a visual keyboard, or a pointing device, and an output device including an adapter such as a monitor or a touch screen. In an embodiment, the user input/output unit 1350 may correspond to a computing device connected via remote access, and in such a case, the hardware-embedded pointing transfer processing device 100 may serve as an independent server.

The network input/output unit 1370 provides a communication environment for connecting to a user terminal via a network, and may include an adapter for communication such as a local area network (LAN), a metropolitan area network (MAN), a wide area network (WAN), and a value added network (VAN). In addition, the network input/output unit 1370 may be implemented to provide a short-distance communication function such as Wi-Fi or Bluetooth or a wireless communication function of 4G or higher for wireless transmission of data.

The communication port 1390 is a hardware interface for connecting to external hardware, and the external hardware may include, for example, a printer, a mouse, and USB hardware. The communication port 1390 may detect connection of specific USB hardware to cause the hardware-embedded pointing transfer processing device 100 to operate.

The hardware-embedded pointing transfer processing device and method according to the present disclosure can consistently apply a user-defined gain without being affected by the operating system (OS) and hardware settings, thereby providing user-customized pointer control, independence from operating system settings, suitability for games and high-performance tasks, and versatility in various environments. That is, users can directly define pointing transfer functions that meet their needs in physical units and upload the same to hardware firmware, thereby experiencing the same pointer speed and performance regardless of changes in the operating system or hardware settings. Accordingly, the hardware-embedded pointing transfer processing device and method according to the present disclosure can increase the consistency of user experience and can be useful in environments such as high-performance tasks or games.

In addition, the present disclosure can provide an optimal solution for high-performance users such as professional gamers by enabling hardware-embedded firmware to cancel the influence of the default gain of the operating system and continuously provide a pointing transfer function desired by a user.

Although the preferred embodiments of the present disclosure have been described above, those skilled in the art can understand that the present disclosure can be modified and changed in various manners within the scope of the spirit and scope of the present disclosure described in the following claims.

[National Research Development Project supporting the Present Invention]

[Project Serial No.] 2710006677

[Project No.] RS-2020-II201361

[Department] Ministry of Science and ICT

[Project management (Professional) Institute] Institute of Information & Communications Technology Planning & Evaluation

[Research Project Name] Nurturing ICT and Broadcasting Innovation Talents (R&D)

[Research Task Name] Artificial Intelligence Graduate School Support Project (Yonsei University)

[Project Performing Institute] University Industry Foundation, Yonsei University

[Research Period] 2024.01.01~2024.12.31

[National Research Development Project supporting the Present Invention]

[Project Serial No.] 2710001593

[Project No.] RS-2023-00223062

[Department] Ministry of Science and ICT

[Project management (Professional) Institute] National Research Foundation of Korea

[Research Project Name] Basic Research Laboratory Promotion Project

[Research Task Name] E-sports Player Behavior Simulation Laboratory Based on Bounded Rationality Theory

[Project Performing Institute] University Industry Foundation, Yonsei University

[Research Period] 2024.03.01~2025.02.28

DETAILED DESCRIPTION OF MAIN ELEMENTS

100: Hardware-embedded pointing transfer processing device
110: User control command receiver
130: Sensor
150: Pointing data processor
151: Gain computation module
153: Cancellation gain determination module
155: Default gain determination module
157: Control module

What is claimed is:

1. A hardware-embedded pointing transfer processing device comprising:
a user control command receiver configured to receive a user control command;
a sensor configured to output mouse movement data on the basis of the control command;
a pointing data processor configured to set a user-defined gain based on the mouse movement data and provide a cancellation gain capable of canceling out a default gain provided by an operating system for the user-defined gain; and
a cancellation gain determination module configured to determine the cancellation gain through a relationship between the user-defined gain and the default gain,
wherein the cancellation gain determination module stores the cancellation gain in a memory and reflects the cancellation gain in real time whenever the mouse movement data is generated.

2. The hardware-embedded pointing transfer processing device of claim 1, wherein the pointing data processor comprises a gain computation module configured to determine a physical movement speed of the sensor in physical units of the mouse movement data and determine a movement speed of a pointer on a screen in physical units of the mouse movement data.

3. The hardware-embedded pointing transfer processing device of claim 2, wherein the gain computation module computes a ratio between the physical movement speed (unit: m/s) of the sensor and the movement speed (unit:px/s) of the pointer on the screen as the user-defined gain.

4. The hardware-embedded pointing transfer processing device of claim 1, wherein the pointing data processor further comprises a default gain determination module configured to determine the default gain on the basis of an acceleration gain or a constant gain provided by the operating system.

5. The hardware-embedded pointing transfer processing device of claim 4, wherein the default gain determination module computes a residual value based on the user-defined gain, the cancellation gain, and the default gain such that the gain computation module corrects an error in next input mouse movement data.

6. A hardware-embedded pointing transfer processing method performed in a hardware-embedded pointing transfer processing device, comprising:
a user control command reception step of receiving a user control command;
a sensing step for outputting mouse movement data on the basis of the control command; and
a pointing data processing step of setting a user-defined gain based on the mouse movement data and providing a cancellation gain capable of canceling out a default gain provided by an operating system for the user-defined gain,
wherein the pointing data processing step comprises:
determining the cancellation gain through a relationship between the user-defined gain and the default gain; and
storing the cancellation gain in a memory and reflecting the cancellation gain in real time whenever the mouse movement data is generated.

7. The hardware-embedded pointing transfer processing method of claim 6, wherein the pointing data processing step further comprises:
determining a physical movement speed of a sensor in physical units of the mouse movement data and determining a movement speed of a pointer on a screen in physical units of the mouse movement data; and
computing a ratio between the physical movement speed (unit:m/s) of the sensor and the movement speed (unit: px/s) of the pointer on the screen as the user-defined gain.

8. The hardware-embedded pointing transfer processing method of claim 6, wherein the pointing data processing step comprises:
determining the default gain on the basis of an acceleration gain or a constant gain provided by the operating system; and
computing a residual value based on the user-defined gain, the cancellation gain, and the default gain such that a gain computation module corrects an error in next input mouse movement data.

* * * * *